United States Patent [19]

Jenkins

[11] Patent Number: 4,707,065
[45] Date of Patent: Nov. 17, 1987

[54] OPTICAL FIBRE SEALING ASSEMBLY

[75] Inventor: Peter D. Jenkins, Woodbridge, England

[73] Assignee: British Telecommunications, United Kingdom

[21] Appl. No.: 679,042

[22] PCT Filed: Apr. 12, 1984

[86] PCT No.: PCT/GB84/00126
§ 371 Date: Dec. 5, 1984
§ 102(e) Date: Dec. 5, 1984

[87] PCT Pub. No.: WO84/04176
PCT Pub. Date: Oct. 25, 1984

[30] Foreign Application Priority Data

Apr. 14, 1983 [GB] United Kingdom ............... 8310131

[51] Int. Cl.4 .................................. G02B 6/36
[52] U.S. Cl. .................................. 350/96.20
[58] Field of Search ............... 350/96.20, 96.21, 96.22

[56] References Cited

U.S. PATENT DOCUMENTS 4,295,707 10/1981 Nakai et al. ............... 350/96.20 X
4,389,086 1/1983 Furusawa et al. ............ 350/96.20
4,606,603 8/1986 Cairns ........................ 350/96.21

FOREIGN PATENT DOCUMENTS 1134654 2/1982 Canada .
0078049 5/1983 European Pat. Off. .
0582813 8/1983 Japan .
2057936 4/1981 United Kingdom .

Primary Examiner—Eugene R. LaRoche
Assistant Examiner—James C. Lee
Attorney, Agent, or Firm—Nixon & Vanderhye

[57] ABSTRACT

A sealing assembly for an optical fibre feed through inhibits passage of water or gases via a fibre's protective sheath while preserving mechanical protection of the fibre (A—A') of the fibre (4) is exposed by removal of the corresponding sheath portion. Both the exposed surface of the fibre (4) and the ends (6',6) of the sheath (5) are sealed into a common bore (2) in a ferrule (1). Demountable end members (9,10) may be provided, to extend the bore (2) into which the sheath ends (6',6) are sealed. The sealing assembly finds particular application in optical fibre feed through at submarine cable repeater housing bulkheads.

17 Claims, 4 Drawing Figures

OPTICAL FIBRE SEALING ASSEMBLY

FIELD OF THE INVENTION

The invention relates to optical fibre feed through and finds particular application in optical fibre feed through at repeater housings, especially in submarine optical fibre cables.

BACKGROUND OF THE INVENTION

Water and gases (particularly hydrogen) can cause substantial damage if they penetrate into a repeater housing. For instance electronic components, particularly semi-conductors, metal oxide resistors, and surface acoustic wave filters could be damaged by water or gas ingress. If water or gases have penetrated into a submarine cable, which can occur as a result of permeation or cable damage for example, then it is clearly important to prvent them from entering a repeater housing.

Optical fibres contained in a submarine cable are often provided with a protective sheath which may comprise a primary layer, of silicone rubber for instance, and a secondary layer of, say, a polymeric material. A potential path for water and gases into a repeater housing is provided by any optical fibre feed through into the housing, the path being along the layers of the protective sheath of the optical fibre.

In the event of certain types of damage, perhaps affecting the cable to repeater housing joint, then water or gas at considerable pressure may be present at the optical fibre feed through to the repeater housing. It is desirable that the feed through should not allow water or gas ingress even under these conditions.

A second factor affecting the design of a feed through is that optical fibres are extremely fragile. The protection afforded by a protective sheath is therefore a very important factor and preferably should be preserved in some manner even at an optical fibre feed through.

SUMMARY OF THE INVENTION

It is an object of the present invention to reduce the possibility of water and gas ingress along sheathed optical fibres into submarine repeater housings while maintaining satisfactory mechanical protection of the fibres.

According to this invention there is provided a sealing assembly comprising a component having a bore, an optical fibre having a protective sheath and a stripped portion from which said sheath has been removed, the optical fibre being disposed in the bore so that the stripped portion and an adjacent portion having said sheath are within the bore and with a first sealant sealing said stripped portion to the bore and a second sealant sealing said adjacent portion to the bore.

BRIEF DESCRIPTION OF THE DRAWINGS

By way of example only, illustrative embodiments of the invention will now be described with reference to the accompanying drawings, in which.

Please note that some cross-hatching is omitted from the Figures for the sake of clarity.

DETAILED DESCRIPTION

Figure 1:
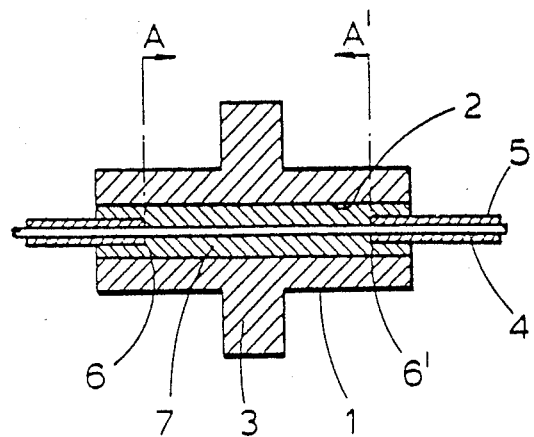
FIG. 1 is a sectional view of a sealing assembly according to a first embodiment of the invention.

Referring now to FIG. 1, an elongate, generally tubular member or ferrule 1 has a bore 2 throughout its length, and an external peripheral shoulder 3. An optical fibre 4 extends through the bore. The fibre is provided with a protective sheath 5. A portion A—A' of the fibre within the bore has been exposed by the removal of the corresponding sheath portion, producing sheath ends 6, 6'. The fibre portion A—A', the sheath ends 6, 6' and the sheath adjacent the sheath ends, are all sealed within the bore 2 by an encapsulant 7. An epoxy resin may be a suitable encapsulant.

Figure 2A:
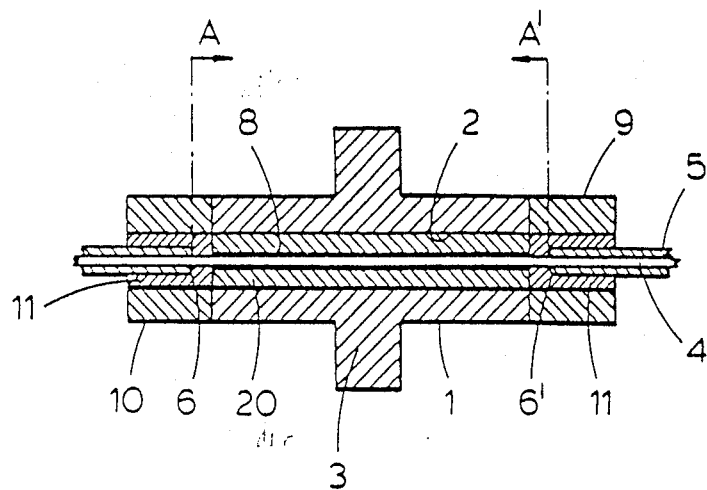
FIG. 2a is a sectional view of a sealing assembly according to a second embodiment of the invention. Elements of the sealing assembly which also appear in FIG. 1 are allotted the same reference numerals.

FIG. 2a shows a more complex assembly in which the portion A—A' of the fibre 4 is provided with a metallization layer 8. The fibre 4, in the region of the metallization layer 8, is sealed to the wall of the bore by solder (20). The solder (20) is a low melting point metallic alloy. Adjacent the ends of the ferrule 1 there are additional generally tubular end members 9, 10 positioned so as to act as extensions of the bore 2. The ends 6, 6' of the protective sheath are secured within respective end members 9, 10 by means of an encapsulant 11, which encapsulant 11 may again comprise an epoxy resin. The ferrule 1 is constructed in this case out of a metallic material.

Although other metallization layers may be found suitable, a metallisation layer 8 made up of coatings including chromium (adjacent to the fibre surface), copper and gold (as the outermost layer) has been used and found satisfactory.

Figure 2B:
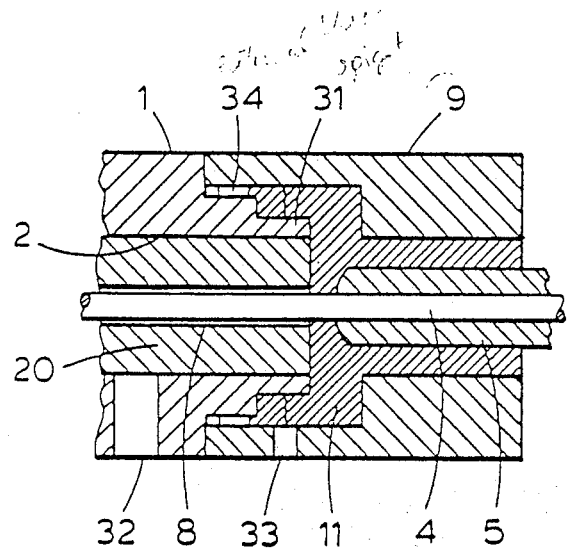
FIG. 2b is a sectional view of part of the assembly shown in FIG. 2a, including an end member, shown in greater detail.

The ferrule 1 is provided with an external thread 34, as shown in FIG. 2b, in the region of each end, by means of which the end members 9, 10 may be screw mounted onto the ferrule 1. The ferrule 1 is also provided with a lateral aperture 32 through which the solder 20 may be conveniently introduced to the bore 2. Similarly the end members 9, 10 are each provided with lateral apertures 33 through which the encapsulant 11 may be introduced.

The ends of the ferrule 1 are further provided with spigots 31 whose function is described below.

Figure 3:
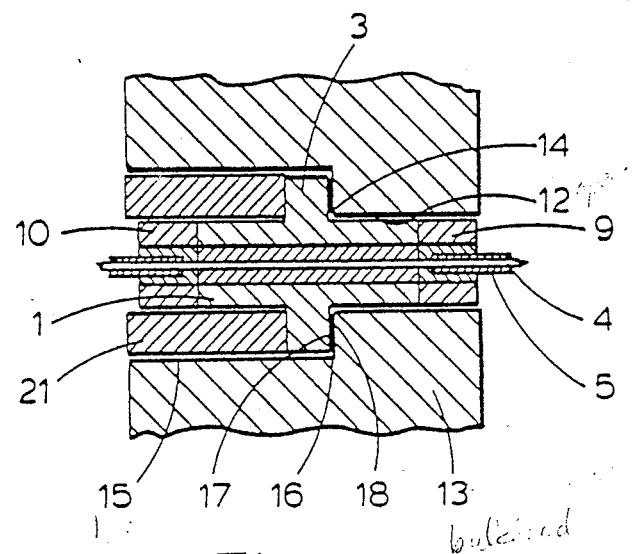
FIG. 3 is a sectional view of the assembly of FIG. 2a mounted within a bulkhead.

FIG. 3 shows an assembly of the type shown in FIG. 2a positioned within a through aperture 12 in a bulkhead 13. The aperture 12 is provided with a shoulder 14, by means of a change in cross sectional area, with which the shoulder 3 of the ferrule 1 cooperates. A first end member 9 of the assembly is positioned within the portion of the aperture 12 which has a reduced cross sectional area. The portion of the aperture 12 which has the larger cross sectional area has a thread 15. A generally tubular retaining member 21, which is provided with an external thread, pases over the second end member 10 of the assembly and is tightened within the thread 15. A deformable sealing member 16 is provided between the opposing faces 17, 18 of the shoulders 3 and 14. The sealing member 16 is deformed between the faces 17, 18 to form a seal between the assembly and the bulkhead 13. The sealing member 16 may be an 'O' ring of rubber or metal, or any other suitable metal to metal sealing ring, or an 'olive' similar to a pipe sealing fitting.

Typical dimensions, in mm, of the components of a sealing assembly as described above may be substantially as follows:

| | |
|---|---|
| Length of ferrule 1 | 24.9 |
| Length of a first end member 9 | 15.0 |
| Length of a second end member 10 | 18.0 |
| Length of internally threaded portions of end members 9, 10 | 2.5 |
| Length of external thread 34 on ferrule 1 | 1.2 |
| Length of spigots | 1.2 |
| Bore diameter of end members 9, 10 | 1.6 |
| External diameter of shoulder 3 | 8.3 |
| Thickness of shoulder 3 | 3.0 |
| Bore diameter of ferrule 1 | 1.0 |

Clearly certain of the above dimensions will vary depending on, for instance, the external diameter of the protective sheath 5 of the optical fibre 4. The ferrule 1 must be capable of sliding along the sheath 5 before being brought into position over the exposed portion A—A' of the optical fibre 4. The bore diameter of the ferrule 1 must therefore be greater than or a sliding fit with said external diameter.

A method of making the assembly described with reference to FIGS. 2a and 2b is as follows. The ferrule 1 and end members 9, 10 are mounted on the fibre 4 in a position close to the portion A—A' of the fibre 4 which is to be sealed into the bore 2. The said portion of the fibre 4 is then exposed by removal of the corresponding sheath portion and the surface of the exposed fibre portion is cleaned by for instance a suitable chemical cleaning process. Metallization of the portion of the fibre is carried out by a method such as vacuum deposition. The ferrule 1 is then slid into position over the exposed portion of fibre and heated to a temperature above the melting point of the solder 20.

The solder 20, in a melted state, is injected through the lateral aperture 32 in the ferrule 1 into the bore 2. During the solder injection stage, a current of cooling gas is directed acorss the bore at each end of the ferrule 1. When the solder 20 has filled the bore 2 in a region between the lateral aperture 32 and an end of the ferrule 1, it will start to exude from the bore 2. The cooling gas aids its solidification where it exudes, so plugging one end of the bore 2 and avoiding damage to the sheath 5 which might be caused by the molten solder 20. Injection of the solder 20 is continued until it begins to exude from the second end of the bore 2 where the cooling gas will again help it to solidify, plugging the second end of the bore 2. Injection of the solder 20 is then ceased and the ferrule 1 allowed to cool.

After the ferrule 1 has cooled sufficiently, both end members 9, 10 are slid up to their respective ends of the ferrule 1 and screwed into position over the ends 6, 6' of the sheath 5. An encapsulant 11 such as an epoxy resin is injected through the lateral aperture 33 in each end member 9, 10 until the bores of the end members 9, 10 are filled. After curing, or whatever setting process may be relevant to the encapsulant 11, the assembly is complete.

A feature which improves the completed assembly by preventing displacement of the optical fibre 4 in the end members 9, 10 during injection of the encapsulant 11 is the provision of a spigot 31 on each end of the ferrule 1. The spigots 31 comprise a short extension of the ferrule 1, of smaller external diameter than that of the threaded portion on which the end members 9, 10 can be screw mounted. If the lateral aperture 33 in each end member 9, 10 is arranged to lie adjacent to a spigot 31, the encapsulant 11 will impinge during injection on the relevant spigot 31 instead of impinging in a lateral direction on the optical fibre 4. As each end member 9, 10 fills with encapsulant 11, the encapsulant 11 will tend to be directed by the spigots 31 to impinge on the fibre 4 in a direction substantially parallel to it, thus reducing or eliminating any tendency of the fibre 4 to be displaced laterally in the end members 9, 10 during this encapsulation step.

A further advantage of the above spigots 31 is that the sealing effectiveness, against water or gas under pressure, of the encapsulant 11 in the end members 9, 10 can be increased if the end members 9, 10 are each internally threaded, as shown in FIG. 2b, in the region adjacent to the spigots in the completed assembly. The increase in sealing effectiveness is due to the co-operation between the encapsulant 11 and the internal threading.

Although the end members 9, 10 referred to above are not a necessary feature of sealing assemblies according to the invention, they do have the advantage that, where a solder 20 is to be used, the ferrule 1 can be heated to a temperature above the melting point of the solder 20 without the ends 6, 6' of the sheath 5 being melted. If the ends 6, 6' of the sheath 5 are to be sealed into the ferrule 1 in common with the exposed portion A—A' of the fibre 4, they must extend into the ends of the bore 2 before a solder injection step. Heating of the ferrule 1 to a temperature above the melting point of the solder 20 can have the deleterious effect of melting the ends 6, 6' of the sheath 5. Where end members 9, 10 are provided, the ends 6, 6' of the sheath 5 can be external to the ferrule 1 during the solder injection step.

By using a sealing assembly according to an embodiment of the present invention, having both an exposed portion of an optical fibre 4 and the ends 6, 6' of its protective sheath 5 sealed into a common bore 2 in the completed assembly, the mechanical integrity of the sheath 5 is effectively preserved. The fibre 4 is as well protected after completion of the assembly as it would be protected were the sheath to remain intact.

According to the intended use of the assembly, however, it may only be necessary to seal one end 9 of the sheath 5 into the bore 2, there being no sheath present on one or other side of the assembly. The mechanical integrity of the sheath 5 that is present however will of course be maintained as far as the ferrule 1.

It may not be necessary that the sheath 5 should be sealed to the wall of the bore 2 around its whole circumference. The principal aim is to retain the sheath 5 in the bore 2 effectively. Such circumferential sealing may however be preferred if it is required to enhance the sealing efficiency of the assembly.

As can be seen the assembly provides a simple method of sealing an optical fibre to a bulkhead. It will be appreciated that once the initial seal between a fibre and a ferrule has been produced it is possible to seal the fibre to a wide variety of components by sealing the ferrule thereto in a conventional manner. The character and material of the component concerned will be dictated by the use for which it is intended.

Another advantage of the assembly is that it can itself be pretested for sealing effectiveness before being mounted in another component. It is also capable of being mounted as an independent unit in another component so that it can be demounted if necessary, without disturbance of other equipment, and tested individually for sealing effectiveness.

Although the present invention has been described with particular reference to submarine repeaters it is to be understood that the invention is in no way limited to such an application. The invention may be useful in any location where a fibre passes through a solid divider between two media which are to be kept separate, for example in chemical plant or in nuclear installations. The invention is generally applicable where a pressure differential is to be maintained across a solid divider through which a fibre passes.

The expression 'low melting point metallic alloy' as used within this specification refers to an alloy having a melting point which is less than that of the glasses from which the outer layers of the optical fibre are made. It will be clear tht the melting point should be lower than a temperature likely to cause damage to the materials of the optical fibre concerned.

Materials other than alloys, for instance tin, may be found suitable for sealing the fibre into a ferrule. Amongst alloys however that have been found suitable are included known solders such as tin/silver, tin/lead and tin/bismuth.

Optical fibre cables may conveniently be supplied with all or some of their optical fibres sealed to assemblies as described above.

Where the bulkhead 13 mentioned with reference to FIG. 3 is a repeater housing bulkhead, it may be desirable that a plurality of apertures 12 is provided in the bulkhead 13, each aperture 12 having an optical fibre sealing assembly mounted therein.

I claim:

1. A sealing assembly comprising a component having a bore, an optical fibre having a protective sheath and a stripped portion from which said sheath has been removed, the optical fibre being disposed in the bore so that the stripped portion and an adjacent portion having said sheath are within the bore and with a first sealant sealing said stripped portion to the bore and a second sealant sealing said adjacent portion to the bore.

2. The sealing assembly of claim 1, in which the component comprises a ferrule having an end member with the bore extending through the end member and said adjacent portion is sealed to the bore within the end member.

3. The sealing assembly of claim 2 in which the end member and ferrule are engaged to each other by a screw thread.

4. The sealing assembly of claim 2 in which the ferrule comprises a tubular wall having a lateral aperture that communicates with the bore for introduction of the first sealant and the end member comprises a tubular wall having a lateral aperture that communicates with the bore for introduction of the second sealant.

5. The sealing assembly of claim 4 in which the ferrule is provided with a tubular spigot that is coaxial with the bore and extends into the end member and the lateral aperture in the end member communicates with the bore at a location adjacent the spigot.

6. The sealing assembly according to claim 1 in which a sheathed portion of fibre extends into each end of the component, the component comprising a ferrule within which the stripped portion of fibre is sealed and end members at each end of the ferrule within which the sheathed portions of fibre are sealed.

7. The sealing assembly of claim 1 in which the first sealant comprises epoxy resin.

8. The sealing assembly of claim 1 in which the second sealant comprises epoxy resin.

9. The sealing asembly of claim 1 in which the first sealant comprises low melting point metallic alloy.

10. A sealing assembly comprising a ferrule having a longitudinal bore and an end member mounted on the end of the ferrule and having a bore in register with the bore of the ferrule, the ferrule having a tubular spigot coaxial with the bore of the ferrule and extending into the end member and the end member having a lateral aperture that communicates with the bore of the end member at a location adjacent the spigot, and an optical fibre having a protective sheath and a stripped portion from which the sheath has been removed and on which a metallic layer has been deposited, the fibre being threaded through the bores of the ferrule and end member so that the stripped portion is within the ferrule and is sealed within the bore of the ferrule by metal solder and an adjacent sheathed portion is within the end member and is sealed within the bore of the end member by an epoxy resin.

11. A sealing assembly according to claim 10 in which the metallic layer comprises chromium adjacent the fibre surface and at least one of copper and gold as an outermost layer.

12. A method of making a sealing assembly comprising the steps of removing a portion of sheath from a sheathed optical fibre so as to expose the outer surface of a length of fibre, locating the fibre within a component having a longitudinal bore and sealing the exposed length of fibre within the bore with a first sealant and sealing an adjacent portion of sheathed fibre within the bore with a second sealant.

13. The method of claim 12 including the step of metallizing the exposed length of fibre.

14. The method of claim 12 including the step of injecting the first sealant through a lateral aperture in the component.

15. The method of claim 12 incuding the step of injecting the second sealant through a lateral aperture in the component.

16. The method of claim 2 in which the component comprises a ferrule with a longitudinal bore and an end member with a bore in register with the bore of the ferrule, including the steps of sealing the exposed fibre within the bore of the ferrule prior to monnting the end member on the ferrule, mounting the end member on the ferrule and sealing the adjacent portion of sheathed fibre within the bore and the end member.

17. The method of claim 14 in which the exposed fibre is metallized with chromium adjacent the fibre surface and at least one of copper and gold as an outermost layer.

* * * * *